Nov. 22, 1966   H. GLANTZ   3,286,386

AUTOMOBILE PARKING SIGNAL

Filed Jan. 14, 1966

*INVENTOR.*
HERSHEY GLANTZ
BY

United States Patent Office 3,286,386
Patented Nov. 22, 1966

3,286,386
AUTOMOBILE PARKING SIGNAL
Hershey Glantz, 1401 SW. 17th Terrace, Miami, Fla.
Filed Jan. 14, 1966, Ser. No. 520,781
1 Claim. (Cl. 40—129)

This invention relates to automobile parking signals and more particularly to an automobile identification means for use in parking lots.

The importance of quickly locating a particular automobile in a large parking lot has always presented a problem. Prior devices, such as flags equipped with clamps for fastening to the car, often marred the surface thereof and were subject to dislocation from jarring or from the wind. The use of chalk marks on the tops of cars are not only relatively ineffective, but also disfigure the surface of the vehicle.

The present invention overcomes the above objections and disadvantages by the provision of a flagstaff having a pair of numeral bearing flags thereon with a flexible attachment means at the lower end of the staff for frictionally engaging the gutter around the automobile top, which is present on the vast majority of automobiles.

A principal object of the invention is the provision of a flagstaff base made of an elastomer having a horizontal portion adapted to engage the gutter of an automobile top and hold the flagstaff with an identification flag thereon, readily visible from a reasonable distance.

A further object of the invention is the provision of a flagstaff with quick detachable non-marring means for attachment to the gutter of an automobile terminating at the upper end thereof in a pair of planar flags positioned at right angles to each other for bearing an identification number and secured to the staff at the junction thereof for observation from all directions.

These and other objects and advantages in one embodiment of the invention are shown and described in the following specification and drawing, in which.

Figure 1:
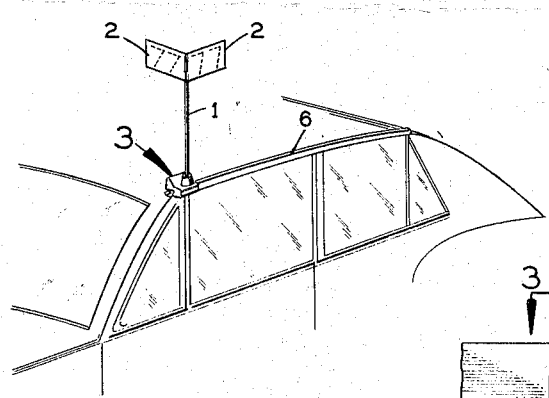
FIG. 1 illustrates the identifying flag assembly attached to the gutter of an automobile.
Figure 2:
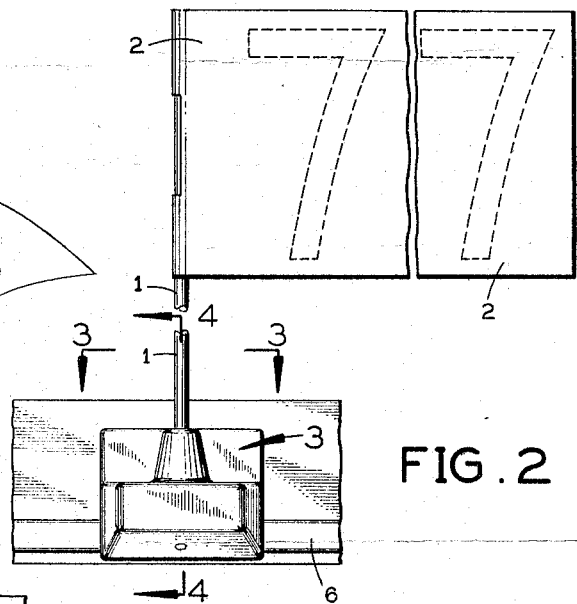
FIG. 2 is an enlarged side elevation of the flag assembly shown in FIG. 1 secured to a fragmentary portion of the automobile top.

Referring to FIGS. 1 and 2, the flagstaff 1 has secured to the upper end thereof a pair of flags 2—2 positioned at right angles to each other at a junction secured to the staff by well known means.

Figure 3:
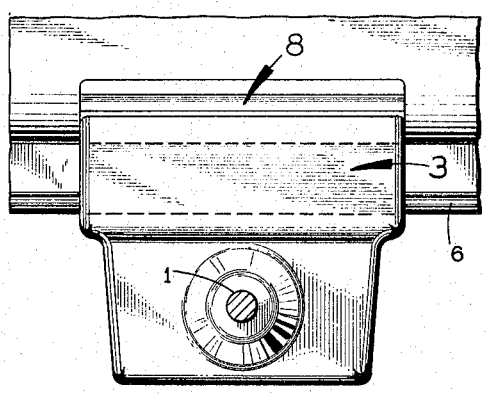
FIG. 3 is a further enlarged top plan view of the flagstaff holder taken through section line 3—3, FIG. 2, attached to a fragmentary portion of the automobile top.
Figure 4:
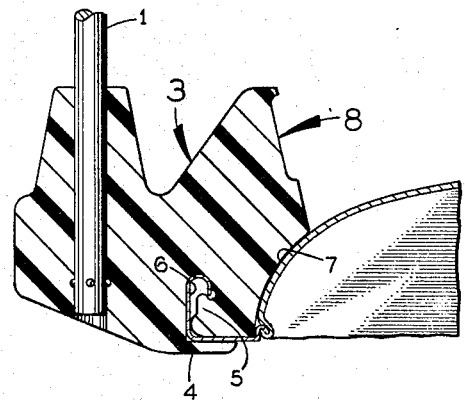
FIG. 4 is a fragmentary cross sectional elevation taken through section line 4—4, FIG. 2.

Each flag is positioned with the same number or designation on both sides thereof so as to be visible from all directions. Referring to FIGS. 2, 3, and 4, a body member 3 made from rubber or other plastic elastomer has the lower end of staff 1 secured therein by well known means and is provided with a transverse groove in the lower portion thereof forming a lower lip 4 and a gutter projection 5 having two elongated radial surfaces, as shown, for engagement with a conventional gutter 6 along the roof of an automobile. It is to be noted that the inner side 7 of the base is radiused to fix the average curvature of the top of an auto. A lateral depression 8 parallel the gutter is provided for the manual flexing of the body for installing or removing same from an automobile, as illustrated in FIG. 5.

Figure 5:
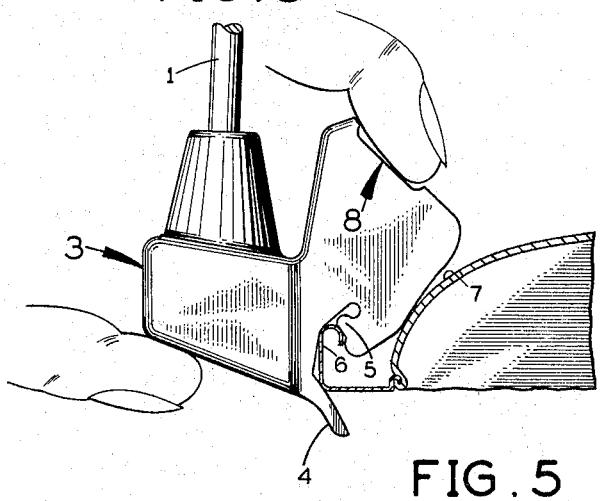
FIG. 5 is an end view of the flag holder illustrating the manual application to an automobile and gutter with the latter shown in fragmentary cross section.

In operation, the signal is placed upon the car by contracting the body member 3 between the fingers and a thumb and urging and springing the members 4 and 5 into position, as shown in FIG. 5, and upon the release of body 3 the lip 4 and the projection 5 will assume the position shown in FIG. 4 which will secure the mast in a secure vertical position for good visibility and without damage to the automobile.

It is understood that certain modifications in the construction, utilizing the features above described, are intended to come within the scope of the appended claim.

Having described my invention, I claim:

An automobile signal for attachment to the gutter portion thereof comprising a body member molded from an elastomer material having a transverse groove of uniform cross section in close proximity with the bottom thereof formed substantially to the shape of the outer surface of a gutter of the automobile top,
 a tongue integral with said body of uniform cross section projecting into said groove along its length for engagement with the inner surface of said gutter,
 a lip of predetermined thickness and uniform cross section integral with said body extending under and overlapping said groove a predetermined distance,
 said body adapted to rest against the outer margin of said top adjacent said gutter when said gutter is positioned in said groove with said tongue extending therein and said lip bearing against the underside of said gutter for retaining said body in substantially rigid relation to said gutter,
 a rod of predetermined length forming a flagstaff having a lower end portion thereof secured in said body in substantial vertical relation to said gutter when said body member is engaged therewith including an identification flag secured on the upper portion thereof whereby said signal may be applied or removed from said gutter by manually tilting said body normal to said gutter and temporarily flexing said lip and said projection into and from engagement with said gutter respectively.

References Cited by the Examiner
UNITED STATES PATENTS

| 2,546,855 | 3/1951 | France | 40—129 X |
| 2,764,122 | 9/1956 | Irwin | 116—173 |
| 2,802,443 | 8/1957 | Hanson. | |
| 3,130,463 | 4/1964 | Posey | 24—137 |
| 3,136,289 | 6/1964 | Johnson | 40—129 X |

EUGENE R. CAPOZIO, *Primary Examiner.*
S. M. BENDER, *Assistant Examiner.*